(12) United States Patent
Cohen et al.

(10) Patent No.: US 9,083,550 B2
(45) Date of Patent: Jul. 14, 2015

(54) NETWORK VIRTUALIZATION OVER INFINIBAND

(71) Applicant: Oracle International Corporation, Redwood Shores, CA (US)

(72) Inventors: Ariel Cohen, Cupertino, CA (US); Ashok Krishnamurthi, Saratoga, CA (US)

(73) Assignee: Oracle International Corporation, Redwood Shores, CA (US)

( * ) Notice: Subject to any disclaimer, the term of this patent is extended or adjusted under 35 U.S.C. 154(b) by 228 days.

(21) Appl. No.: 13/663,405

(22) Filed: Oct. 29, 2012

(65) Prior Publication Data

US 2014/0122675 A1    May 1, 2014

(51) Int. Cl.
  *G06F 15/173*   (2006.01)
  *H04L 12/413*   (2006.01)
  *H04L 12/46*    (2006.01)
  *H04L 12/24*    (2006.01)

(52) U.S. Cl.
  CPC .......... *H04L 12/413* (2013.01); *H04L 12/4633* (2013.01); *H04L 12/4641* (2013.01); *H04L 41/0803* (2013.01)

(58) Field of Classification Search
  None
  See application file for complete search history.

(56) References Cited

U.S. PATENT DOCUMENTS

| | | | |
|---|---|---|---|
| 5,621,913 A | 4/1997 | Tuttle et al. | |
| 5,754,948 A | 5/1998 | Metze | |
| 5,815,675 A | 9/1998 | Steele et al. | |
| 5,898,815 A | 4/1999 | Bluhm et al. | |
| 6,003,112 A | 12/1999 | Tetrick | |
| 6,069,895 A | 5/2000 | Ayandeh | |
| 6,145,028 A | 11/2000 | Shank et al. | |
| 6,157,955 A | 12/2000 | Narad et al. | |
| 6,247,086 B1 | 6/2001 | Allingham | |
| 6,253,334 B1 | 6/2001 | Amdahl et al. | |
| 6,282,647 B1 | 8/2001 | Leung et al. | |
| 6,308,282 B1 | 10/2001 | Huang et al. | |
| 6,314,525 B1 | 11/2001 | Mahalingham et al. | |
| 6,331,983 B1 | 12/2001 | Haggerty et al. | |
| 6,343,324 B1 | 1/2002 | Hubis et al. | |
| 6,377,992 B1 | 4/2002 | Plaza Fernández et al. | |
| 6,393,483 B1 | 5/2002 | Latif et al. | |
| 6,401,117 B1 | 6/2002 | Narad et al. | |
| 6,418,494 B1 | 7/2002 | Shatas et al. | |
| 6,430,191 B1 | 8/2002 | Klausmeier et al. | |
| 6,466,993 B1 | 10/2002 | Bonola | |
| 6,470,397 B1 | 10/2002 | Shah et al. | |

(Continued)

OTHER PUBLICATIONS

Wikipedia's article on 'Infiniband' from Aug. 2010.

(Continued)

*Primary Examiner* — Joshua Joo
(74) *Attorney, Agent, or Firm* — Kilpatrick Townsend & Stockton LLP

(57) ABSTRACT

Mechanisms are provided to allow servers connected over an InfiniBand fabric to communicate using multiple private virtual interconnects (PVIs). In particular embodiments, the PVIs appear as virtual Ethernet networks to users on individual servers and virtual machines running on the individual servers. Each PVI is represented on the server by a virtual network interface card (VNIC) and each PVI is mapped to its own InfiniBand multicast group. Data can be transmitted on PVIs as Ethernet packets fully encapsulated, including the layer 2 header, within InfiniBand messages. Broadcast and multicast frames are propagated using InfiniBand.

18 Claims, 6 Drawing Sheets

(56) References Cited

U.S. PATENT DOCUMENTS

| | | |
|---|---|---|
| 6,578,128 B1 | 6/2003 | Arsenault et al. |
| 6,594,329 B1 | 7/2003 | Susnow |
| 6,628,608 B1 | 9/2003 | Lau et al. |
| 6,708,297 B1 | 3/2004 | Bassel |
| 6,725,388 B1 | 4/2004 | Susnow |
| 6,757,725 B1 | 6/2004 | Frantz et al. |
| 6,779,064 B2 | 8/2004 | McGowen et al. |
| 6,804,257 B1 | 10/2004 | Benayoun et al. |
| 6,807,581 B1 | 10/2004 | Starr et al. |
| 6,823,458 B1 | 11/2004 | Lee et al. |
| 6,898,670 B2 | 5/2005 | Nahum |
| 6,931,511 B1 | 8/2005 | Weybrew et al. |
| 6,937,574 B1 * | 8/2005 | Delaney et al. ............... 370/254 |
| 6,963,946 B1 | 11/2005 | Dwork et al. |
| 6,970,921 B1 | 11/2005 | Wang et al. |
| 7,011,845 B2 | 3/2006 | Kozbor et al. |
| 7,046,668 B2 | 5/2006 | Pettey et al. |
| 7,093,265 B1 | 8/2006 | Jantz et al. |
| 7,096,308 B2 | 8/2006 | Main et al. |
| 7,103,064 B2 | 9/2006 | Pettey et al. |
| 7,103,888 B1 | 9/2006 | Cayton et al. |
| 7,111,084 B2 | 9/2006 | Tan et al. |
| 7,120,728 B2 | 10/2006 | Krakirian et al. |
| 7,127,445 B2 | 10/2006 | Mogi et al. |
| 7,143,227 B2 | 11/2006 | Maine |
| 7,159,046 B2 | 1/2007 | Mulla et al. |
| 7,171,434 B2 | 1/2007 | Ibrahim et al. |
| 7,171,495 B2 | 1/2007 | Matters et al. |
| 7,188,209 B2 | 3/2007 | Pettey et al. |
| 7,203,842 B2 | 4/2007 | Kean |
| 7,209,439 B2 | 4/2007 | Rawlins et al. |
| 7,213,246 B1 | 5/2007 | van Rietschote et al. |
| 7,219,183 B2 | 5/2007 | Pettey et al. |
| 7,240,098 B1 | 7/2007 | Mansee |
| 7,260,661 B2 | 8/2007 | Bury et al. |
| 7,269,168 B2 | 9/2007 | Roy et al. |
| 7,281,030 B1 | 10/2007 | Davis |
| 7,281,077 B2 | 10/2007 | Woodral |
| 7,281,169 B2 | 10/2007 | Golasky et al. |
| 7,307,948 B2 | 12/2007 | Infante et al. |
| 7,308,551 B2 | 12/2007 | Arndt et al. |
| 7,334,178 B1 | 2/2008 | Aulagnier |
| 7,345,689 B2 | 3/2008 | Janus et al. |
| 7,346,716 B2 | 3/2008 | Bogin et al. |
| 7,360,017 B2 | 4/2008 | Higaki et al. |
| 7,366,842 B1 | 4/2008 | Acocella et al. |
| 7,386,637 B2 | 6/2008 | Arndt et al. |
| 7,412,536 B2 | 8/2008 | Oliver et al. |
| 7,421,710 B2 | 9/2008 | Qi et al. |
| 7,424,529 B2 | 9/2008 | Hubis |
| 7,433,300 B1 | 10/2008 | Bennett et al. |
| 7,457,897 B1 | 11/2008 | Lee et al. |
| 7,457,906 B2 | 11/2008 | Pettey et al. |
| 7,493,416 B2 | 2/2009 | Pettey |
| 7,502,884 B1 | 3/2009 | Shah et al. |
| 7,509,436 B1 | 3/2009 | Rissmeyer |
| 7,516,252 B2 | 4/2009 | Krithivas |
| 7,602,774 B1 | 10/2009 | Sundaresan et al. |
| 7,606,260 B2 * | 10/2009 | Oguchi et al. ............... 370/465 |
| 7,609,723 B2 | 10/2009 | Munguia |
| 7,634,650 B1 | 12/2009 | Shah et al. |
| 7,669,000 B2 | 2/2010 | Sharma et al. |
| 7,711,789 B1 | 5/2010 | Jnagal et al. |
| 7,733,890 B1 | 6/2010 | Droux et al. |
| 7,782,869 B1 | 8/2010 | Chitlur Srinivasa |
| 7,783,788 B1 | 8/2010 | Quinn et al. |
| 7,792,923 B2 | 9/2010 | Kim |
| 7,793,298 B2 | 9/2010 | Billau et al. |
| 7,821,973 B2 | 10/2010 | McGee et al. |
| 7,836,332 B2 | 11/2010 | Hara et al. |
| 7,843,907 B1 | 11/2010 | Abou-Emara et al. |
| 7,849,153 B2 | 12/2010 | Kim |
| 7,865,626 B2 | 1/2011 | Hubis |
| 7,870,225 B2 | 1/2011 | Kim |
| 7,899,928 B1 * | 3/2011 | Naik et al. ............... 709/238 |
| 7,933,993 B1 | 4/2011 | Skinner |
| 7,937,447 B1 | 5/2011 | Cohen et al. |
| 7,941,814 B1 | 5/2011 | Okcu et al. |
| 8,041,875 B1 | 10/2011 | Shah et al. |
| 8,180,872 B1 | 5/2012 | Marinelli et al. |
| 8,180,949 B1 | 5/2012 | Shah et al. |
| 8,185,664 B1 | 5/2012 | Lok et al. |
| 8,195,854 B1 | 6/2012 | Sihare |
| 8,200,871 B2 | 6/2012 | Rangan et al. |
| 8,218,538 B1 | 7/2012 | Chidambaram et al. |
| 8,228,820 B2 | 7/2012 | Gopal Gowda et al. |
| 8,261,068 B1 | 9/2012 | Raizen et al. |
| 8,285,907 B2 | 10/2012 | Chappell et al. |
| 8,291,148 B1 | 10/2012 | Shah et al. |
| 8,387,044 B2 | 2/2013 | Yamada et al. |
| 8,392,645 B2 | 3/2013 | Miyoshi |
| 8,397,092 B2 | 3/2013 | Karnowski |
| 8,443,119 B1 | 5/2013 | Limaye et al. |
| 8,458,306 B1 | 6/2013 | Sripathi |
| 8,677,023 B2 | 3/2014 | Venkataraghavan et al. |
| 8,892,706 B1 * | 11/2014 | Dalal ............... 709/223 |
| 2001/0032280 A1 | 10/2001 | Osakada et al. |
| 2001/0037406 A1 | 11/2001 | Philbrick et al. |
| 2002/0023151 A1 | 2/2002 | Iwatani |
| 2002/0065984 A1 | 5/2002 | Thompson et al. |
| 2002/0069245 A1 | 6/2002 | Kim |
| 2002/0146448 A1 | 10/2002 | Kozbor et al. |
| 2002/0152327 A1 | 10/2002 | Kagan et al. |
| 2003/0007505 A1 | 1/2003 | Noda et al. |
| 2003/0028716 A1 | 2/2003 | Sved |
| 2003/0037177 A1 | 2/2003 | Sutton et al. |
| 2003/0051076 A1 | 3/2003 | Webber |
| 2003/0081612 A1 | 5/2003 | Goetzinger et al. |
| 2003/0093501 A1 | 5/2003 | Carlson et al. |
| 2003/0099254 A1 | 5/2003 | Richter |
| 2003/0110364 A1 | 6/2003 | Tang et al. |
| 2003/0126315 A1 | 7/2003 | Tan et al. |
| 2003/0126320 A1 | 7/2003 | Liu et al. |
| 2003/0126344 A1 | 7/2003 | Hodapp, Jr. |
| 2003/0131182 A1 | 7/2003 | Kumar et al. |
| 2003/0165140 A1 * | 9/2003 | Tang et al. ............... 370/393 |
| 2003/0172149 A1 | 9/2003 | Edsall et al. |
| 2003/0200315 A1 | 10/2003 | Goldenberg et al. |
| 2003/0208614 A1 | 11/2003 | Wilkes |
| 2003/0212755 A1 | 11/2003 | Shatas et al. |
| 2003/0226018 A1 | 12/2003 | Tardo et al. |
| 2003/0229645 A1 | 12/2003 | Mogi et al. |
| 2004/0003141 A1 | 1/2004 | Matters et al. |
| 2004/0003154 A1 | 1/2004 | Harris et al. |
| 2004/0008713 A1 | 1/2004 | Knight et al. |
| 2004/0025166 A1 | 2/2004 | Adlung et al. |
| 2004/0028063 A1 | 2/2004 | Roy et al. |
| 2004/0030857 A1 | 2/2004 | Krakirian et al. |
| 2004/0034718 A1 | 2/2004 | Goldenberg et al. |
| 2004/0054776 A1 | 3/2004 | Klotz et al. |
| 2004/0057441 A1 | 3/2004 | Li et al. |
| 2004/0064590 A1 | 4/2004 | Starr et al. |
| 2004/0078632 A1 | 4/2004 | Infante et al. |
| 2004/0081145 A1 | 4/2004 | Harrekilde-Petersen et al. |
| 2004/0107300 A1 | 6/2004 | Padmanabhan et al. |
| 2004/0123013 A1 | 6/2004 | Clayton et al. |
| 2004/0139237 A1 | 7/2004 | Rangan et al. |
| 2004/0151188 A1 | 8/2004 | Maveli et al. |
| 2004/0160970 A1 | 8/2004 | Dally et al. |
| 2004/0172494 A1 | 9/2004 | Pettey et al. |
| 2004/0179529 A1 | 9/2004 | Pettey et al. |
| 2004/0210623 A1 * | 10/2004 | Hydrie et al. ............... 709/201 |
| 2004/0218579 A1 | 11/2004 | An |
| 2004/0225719 A1 | 11/2004 | Kisley et al. |
| 2004/0225764 A1 | 11/2004 | Pooni et al. |
| 2004/0233933 A1 | 11/2004 | Munguia |
| 2004/0236877 A1 | 11/2004 | Burton |
| 2005/0010688 A1 | 1/2005 | Murakami et al. |
| 2005/0033878 A1 | 2/2005 | Pangal et al. |
| 2005/0039063 A1 | 2/2005 | Hsu et al. |
| 2005/0044301 A1 | 2/2005 | Vasilevsky et al. |
| 2005/0050191 A1 | 3/2005 | Hubis |
| 2005/0058085 A1 | 3/2005 | Shapiro et al. |
| 2005/0066045 A1 | 3/2005 | Johnson et al. |

(56) References Cited

U.S. PATENT DOCUMENTS

| | | |
|---|---|---|
| 2005/0080923 A1 | 4/2005 | Elzur |
| 2005/0080982 A1 | 4/2005 | Vasilevsky et al. |
| 2005/0091441 A1 | 4/2005 | Qi et al. |
| 2005/0108407 A1* | 5/2005 | Johnson et al. ............... 709/228 |
| 2005/0111483 A1 | 5/2005 | Cripe et al. |
| 2005/0114569 A1 | 5/2005 | Bogin et al. |
| 2005/0114595 A1 | 5/2005 | Karr et al. |
| 2005/0120160 A1 | 6/2005 | Plouffe et al. |
| 2005/0141425 A1 | 6/2005 | Foulds |
| 2005/0160251 A1 | 7/2005 | Zur et al. |
| 2005/0182853 A1 | 8/2005 | Lewites et al. |
| 2005/0188239 A1 | 8/2005 | Golasky et al. |
| 2005/0198410 A1 | 9/2005 | Kagan et al. |
| 2005/0198523 A1 | 9/2005 | Shanbhag et al. |
| 2005/0232285 A1 | 10/2005 | Terrell et al. |
| 2005/0238035 A1 | 10/2005 | Riley |
| 2005/0240621 A1 | 10/2005 | Robertson et al. |
| 2005/0240932 A1 | 10/2005 | Billau et al. |
| 2005/0262269 A1 | 11/2005 | Pike |
| 2006/0007937 A1 | 1/2006 | Sharma |
| 2006/0010287 A1 | 1/2006 | Kim |
| 2006/0013240 A1 | 1/2006 | Ma et al. |
| 2006/0045098 A1 | 3/2006 | Krause |
| 2006/0050693 A1 | 3/2006 | Bury et al. |
| 2006/0059400 A1 | 3/2006 | Clark et al. |
| 2006/0092928 A1 | 5/2006 | Pike et al. |
| 2006/0129699 A1 | 6/2006 | Kagan et al. |
| 2006/0136570 A1 | 6/2006 | Pandya |
| 2006/0168286 A1 | 7/2006 | Makhervaks et al. |
| 2006/0168306 A1 | 7/2006 | Makhervaks et al. |
| 2006/0179178 A1 | 8/2006 | King |
| 2006/0182034 A1 | 8/2006 | Klinker et al. |
| 2006/0184711 A1 | 8/2006 | Pettey et al. |
| 2006/0193327 A1 | 8/2006 | Arndt et al. |
| 2006/0200584 A1* | 9/2006 | Bhat ............................ 709/249 |
| 2006/0212608 A1 | 9/2006 | Arndt et al. |
| 2006/0224843 A1 | 10/2006 | Rao et al. |
| 2006/0233168 A1 | 10/2006 | Lewites et al. |
| 2006/0242332 A1 | 10/2006 | Johnsen et al. |
| 2006/0253619 A1 | 11/2006 | Torudbakken et al. |
| 2006/0282591 A1 | 12/2006 | Krithivas |
| 2006/0292292 A1 | 12/2006 | Brightman et al. |
| 2007/0050520 A1 | 3/2007 | Riley |
| 2007/0067435 A1 | 3/2007 | Landis et al. |
| 2007/0101173 A1 | 5/2007 | Fung |
| 2007/0112574 A1* | 5/2007 | Greene ............................ 705/1 |
| 2007/0112963 A1* | 5/2007 | Dykes et al. ................. 709/227 |
| 2007/0130295 A1 | 6/2007 | Rastogi et al. |
| 2007/0220170 A1 | 9/2007 | Abjanic et al. |
| 2007/0286233 A1 | 12/2007 | Latif et al. |
| 2008/0025217 A1 | 1/2008 | Gusat et al. |
| 2008/0082696 A1 | 4/2008 | Bestler |
| 2008/0159260 A1 | 7/2008 | Vobbilisetty et al. |
| 2008/0192648 A1 | 8/2008 | Galles |
| 2008/0205409 A1* | 8/2008 | McGee et al. ........... 370/395.53 |
| 2008/0225877 A1 | 9/2008 | Yoshida |
| 2008/0270726 A1 | 10/2008 | Elnozahy et al. |
| 2008/0288627 A1 | 11/2008 | Hubis |
| 2008/0301692 A1 | 12/2008 | Billau et al. |
| 2008/0307150 A1 | 12/2008 | Stewart et al. |
| 2009/0070422 A1* | 3/2009 | Kashyap et al. ............. 709/204 |
| 2009/0106470 A1 | 4/2009 | Sharma et al. |
| 2009/0307388 A1 | 12/2009 | Tchapda |
| 2010/0088432 A1 | 4/2010 | Itoh |
| 2010/0138602 A1 | 6/2010 | Kim |
| 2010/0195549 A1 | 8/2010 | Aragon et al. |
| 2010/0293552 A1 | 11/2010 | Allen et al. |
| 2011/0153715 A1 | 6/2011 | Oshins et al. |
| 2011/0154318 A1 | 6/2011 | Oshins et al. |
| 2012/0079143 A1 | 3/2012 | Krishnamurthi et al. |
| 2012/0110385 A1 | 5/2012 | Fleming et al. |
| 2012/0144006 A1 | 6/2012 | Wakamatsu et al. |
| 2012/0158647 A1 | 6/2012 | Yadappanavar et al. |
| 2012/0163376 A1 | 6/2012 | Shukla et al. |
| 2012/0163391 A1 | 6/2012 | Shukla et al. |
| 2012/0166575 A1 | 6/2012 | Ogawa et al. |
| 2012/0167080 A1 | 6/2012 | Vilayannur et al. |
| 2012/0209905 A1 | 8/2012 | Haugh et al. |
| 2012/0239789 A1 | 9/2012 | Ando et al. |
| 2012/0304168 A1 | 11/2012 | Raj Seeniraj et al. |
| 2013/0031200 A1 | 1/2013 | Gulati et al. |
| 2013/0080610 A1 | 3/2013 | Ando |
| 2013/0117421 A1* | 5/2013 | Wimmer ....................... 709/220 |
| 2013/0117485 A1 | 5/2013 | Varchavtchik et al. |
| 2013/0138758 A1 | 5/2013 | Cohen et al. |
| 2013/0138836 A1 | 5/2013 | Cohen et al. |
| 2013/0145072 A1 | 6/2013 | Venkataraghavan et al. |
| 2013/0159637 A1 | 6/2013 | Forgette et al. |
| 2013/0179532 A1 | 7/2013 | Tameshige et al. |
| 2013/0201988 A1* | 8/2013 | Zhou et al. .................... 370/390 |

OTHER PUBLICATIONS

U.S. Appl. No. 12/890,498, Final Office Action mailed on Feb. 7, 2012, 9 pages.

U.S. Appl. No. 12/890,498, Non-Final Office Action mailed on Nov. 3, 2011, 10 pages.

U.S. Appl. No. 12/890,498, Non-Final Office Action mailed on May 21, 2013, 22 pages.

Kesavan et al., Active Coordination (ACT)—Toward Effectively Managing Virtualized Multicore Clouds, IEEE, 2008.

Poulton, Xsigo—Try it out, I dare you!, Nov. 16, 2009.

Ranadive et al., IBMon: Monitoring VMM-Bypass Capable InfiniBand Devices using Memory Introspection, ACM, 2009.

U.S. Appl. No. 11/083,258, Final Office Action mailed on Feb. 2, 2009, 13 pages.

U.S. Appl. No. 11/083,258, Final Office Action mailed on Jun. 10, 2010, 15 pages.

U.S. Appl. No. 11/083,258, Final Office Action mailed on Oct. 26, 2012, 30 pages.

U.S. Appl. No. 11/083,258, Non-Final Office Action mailed on Jul. 11, 2008, 12 pages.

U.S. Appl. No. 11/083,258, Non-Final Office Action mailed on Nov. 12, 2009, 13 pages.

U.S. Appl. No. 11/083,258, Non-Final Office Action mailed on Mar. 28, 2011, 14 pages.

U.S. Appl. No. 11/083,258, Non-Final Office Action mailed on Apr. 25, 2012, 30 pages.

U.S. Appl. No. 11/086,117, Final Office Action mailed on Dec. 23, 2008, 11 pages.

U.S. Appl. No. 11/086,117, Final Office Action mailed on Dec. 10, 2009, 18 pages.

U.S. Appl. No. 11/086,117, Non-Final Office Action mailed on May 6, 2009, 12 pages.

U.S. Appl. No. 11/086,117, Non-Final Office Action mailed on Jul. 22, 2008, 13 pages.

U.S. Appl. No. 11/086,117, Non-Final Office Action mailed on Jul. 22, 2010, 24 pages.

U.S. Appl. No. 11/086,117, Notice of Allowance mailed on Dec. 27, 2010, 15 pages.

U.S. Appl. No. 11/145,698, Final Office Action mailed on Aug. 18, 2009, 22 pages.

U.S. Appl. No. 11/145,698, Final Office Action mailed on Jul. 6, 2011, 26 pages.

U.S. Appl. No. 11/145,698, Non-Final Office Action mailed on May 9, 2013, 13 pages.

U.S. Appl. No. 11/145,698, Non-Final Office Action mailed on Mar. 31, 2009, 22 pages.

U.S. Appl. No. 11/145,698, Non-Final Office Action mailed on Mar. 16, 2011, 24 pages.

U.S. Appl. No. 11/179,085, Final Office Action mailed on Oct. 30, 2007, 13 pages.

U.S. Appl. No. 11/179,085, Non-Final Office Action mailed on May 31, 2007, 14 pages.

U.S. Appl. No. 11/179,085, Notice of Allowance mailed on Aug. 11, 2008, 4 pages.

U.S. Appl. No. 11/179,085, Pre Appeal Brief Request mailed on Jan. 24, 2008, 6 pages.

(56) References Cited

OTHER PUBLICATIONS

U.S. Appl. No. 11/179,085, Preliminary Amendment mailed on May 27, 2008, 9 pages.
U.S. Appl. No. 11/179,085, Response to Non-final Office Action filed on Aug. 10, 2007, 8 pages.
U.S. Appl. No. 11/179,085, filed Jul. 11, 2005.
U.S. Appl. No. 11/179,437, Final Office Action mailed on Jan. 8, 2009, 13 pages.
U.S. Appl. No. 11/179,437, Non-Final Office Action mailed on May 8, 2008, 11 pages.
U.S. Appl. No. 11/179,437, Notice of Allowance mailed on Jun. 1, 2009, 8 pages.
U.S. Appl. No. 11/179,437, filed Jul. 11, 2005.
U.S. Appl. No. 11/184,306, Non-Final Office Action mailed on Apr. 10, 2009, 5 pages.
U.S. Appl. No. 11/184,306, Notice of Allowance mailed on Aug. 10, 2009, 4 pages.
U.S. Appl. No. 11/200,761, Final Office Action mailed on Jul. 9, 2010, 22 pages.
U.S. Appl. No. 11/200,761, Final Office Action mailed on Aug. 13, 2009, 22 pages.
U.S. Appl. No. 11/200,761, Non-Final Office Action mailed on Jun. 11, 2013, 21 pages.
U.S. Appl. No. 11/200,761, Non-Final Office Action mailed on Aug. 31, 2012, 21 pages.
U.S. Appl. No. 11/200,761, Non-Final Office Action mailed on Jan. 20, 2010, 22 pages.
U.S. Appl. No. 11/200,761, Non-Final Office Action mailed on Mar. 12, 2009, 22 pages.
U.S. Appl. No. 11/200,761, Office Action mailed on Feb. 7, 2013, 22 pages.
U.S. Appl. No. 11/200,761, mailed on Aug. 9, 2005, 32 pages.
U.S. Appl. No. 11/222,590, Non-Final Office Action mailed on Mar. 21, 2007, 6 pages.
U.S. Appl. No. 11/222,590, Notice of Allowance mailed on Sep. 18, 2007, 5 pages.
U.S. Appl. No. 12/250,842, Allowed Claims mailed on Jun. 10, 2011.
U.S. Appl. No. 12/250,842, Non-Final Office Action mailed on Aug. 10, 2010, 9 pages.
U.S. Appl. No. 12/250,842, Notice of Allowance mailed on Feb. 18, 2011, 5 pages.
U.S. Appl. No. 12/250,842, Notice of Allowance mailed on Jun. 10, 2011, 5 pages.
U.S. Appl. No. 12/250,842, Response to Non-Final Office Action filed on Nov. 19, 2010, 8 pages.
U.S. Appl. No. 12/250,842, filed Oct. 14, 2008.
U.S. Appl. No. 12/544,744, Final Office Action mailed on Feb. 27, 2013, 27 pages.
U.S. Appl. No. 12/544,744, Non-Final Office Action mailed on Jun. 6, 2012, 26 pages.
U.S. Appl. No. 12/862,977, Non-Final Office Action mailed on Mar. 1, 2012, 8 pages.
U.S. Appl. No. 12/862,977, Non-Final Office Action mailed on Aug. 29, 2012, 9 pages.
U.S. Appl. No. 12/862,977, Notice of Allowance mailed on Feb. 7, 2013, 11 pages.
U.S. Appl. No. 13/229,587, Non-Final Office Action mailed on Oct. 6, 2011, 4 pages.
U.S. Appl. No. 13/229,587, Notice of Allowance mailed on Jan. 19, 2012, 5 pages.
U.S. Appl. No. 13/229,587, Response to Non-Final Office Action filed on Jan. 4, 2012, 4 pages.
U.S. Appl. No. 13/445,570, Notice of Allowance mailed on Jun. 20, 2012, 5 pages.
Bhatt, Creating a Third Generation I/O Interconnect, Intel Developer Network for PCI Express Architecture, www.express-lane.org, printed Aug. 22, 2005, pp. 1-11.
Figueiredo et al., Resource Virtualization Renaissance, IEEE Computer Society, May 2005, pp. 28-31.
Liu et al., High Performance RDMA-Based MPI Implementation over InfiniBand, ICS'03, San Francisco, ACM, Jun. 23-26, 2003, 10 pages.
Wong et al., Effective Generation of Test Sequences for Structural Testing of Concurrent Programs, IEEE International Conference of Complex Computer Systems (ICECCS'05), 2005.
Xu et al., Performance Virtualization for Large-Scale Storage Systems, IEEE, 2003, 10 pages.
U.S. Appl. No. 11/083,258, Advisory Action mailed on Jan. 24, 2013, 3 pages.
U.S. Appl. No. 11/083,258, Final Office Action mailed on Apr. 18, 2014, 37 pages.
International Search Report and Written Opinion of PCT/US2013/065008 mailed on Apr. 16, 2014, 17 pages.
U.S. Appl. No. 12/544,744, Non-Final Office Action mailed on Apr. 4, 2014, 30 pages.
Marshall, Xsigo Systems Launches Company and I/0 Virtualization Product, vmblog.com, http://lvmblog.com/archive/2007/09/15/xsigo-systems-launches-company-and-i-o-virtualization-product.aspx, accessed on Mar. 24, 2014, Sep. 15, 2007.
U.S. Appl. No. 11/083,258, Non-Final Office Action, mailed Sep. 18, 2013, 35 pages.
U.S. Appl. No. 11/145,698, Notice of Allowance, mailed Oct. 24, 2013, 15 pages.
U.S. Appl. No. 11/200,761, Final Office Action mailed Jan. 9, 2014, 23 pages.
U.S. Appl. No. 11/083,258, Non-Final Office Action mailed on Sep. 10, 2014, 34 pages.
U.S. Appl. No. 11/200,761, Advisory Action mailed on Oct. 21, 2009, 2 pages.
U.S. Appl. No. 11/200,761, Advisory Action mailed on Apr. 19, 2013, 3 pages.
U.S. Appl. No. 11/200,761, Advisory Action mailed on Aug. 31, 2010, 3 pages.
U.S. Appl. No. 12/544,744, Final Office Action mailed on Nov. 7, 2014, 32 pages.
U.S. Appl. No. 12/890,498, Advisory Action mailed on Apr. 16, 2012, 4 pages.
U.S. Appl. No. 11/083,258, Final Office Action mailed on Mar. 19, 2015, 37 pages.
U.S. Appl. No. 11/200,761, Non-Final Office Action mailed on Mar. 11, 2015, 24 pages.
U.S. Appl. No. 12/890,498, Non-Final Office Action mailed on Mar. 5, 2015, 24 pages.

\* cited by examiner

| Destination Address 411 | VLAN ID 413 | Destination Infiniband Address Info 415 | Destination Queue Pair 417 |
|---|---|---|---|
| ⋮ | ⋮ | ⋮ | ⋮ |
| ⋮ | ⋮ | ⋮ | ⋮ |

Private Virtual Interconnect Driver Forwarding Table 401

Figure 4

NETWORK VIRTUALIZATION OVER INFINIBAND

TECHNICAL FIELD

The present disclosure relates to network virtualization over InfiniBand.

DESCRIPTION OF RELATED ART

InfiniBand provides a robust, scalable, and fail-safe architecture for connecting nodes such as servers, appliances, and disk arrays. InfiniBand is often used in high performance server clusters and datacenters. In one particular application, InfiniBand is used to connect servers to an input/output (I/O) director that provides efficient virtualized, shared, and fault tolerant I/O resources such as host bus adapters (HBAs) and network interface cards (NICs) to the servers.

However, mechanisms for isolating or separating communications on an InfiniBand fabric are limited. Furthermore, other mechanisms such as Internet Protocol (IP) over Infini-Band (IB) do not easily allow for efficient virtualization. Consequently, techniques and mechanisms are provided to enhance communications over InfiniBand and allow for network virtualization over InfiniBand.

BRIEF DESCRIPTION OF THE DRAWINGS

The disclosure may best be understood by reference to the following description taken in conjunction with the accompanying drawings, which illustrate particular example embodiments.

FIG. 4 illustrates one example of a forwarding table.

DESCRIPTION OF PARTICULAR EMBODIMENTS

Figure 1:
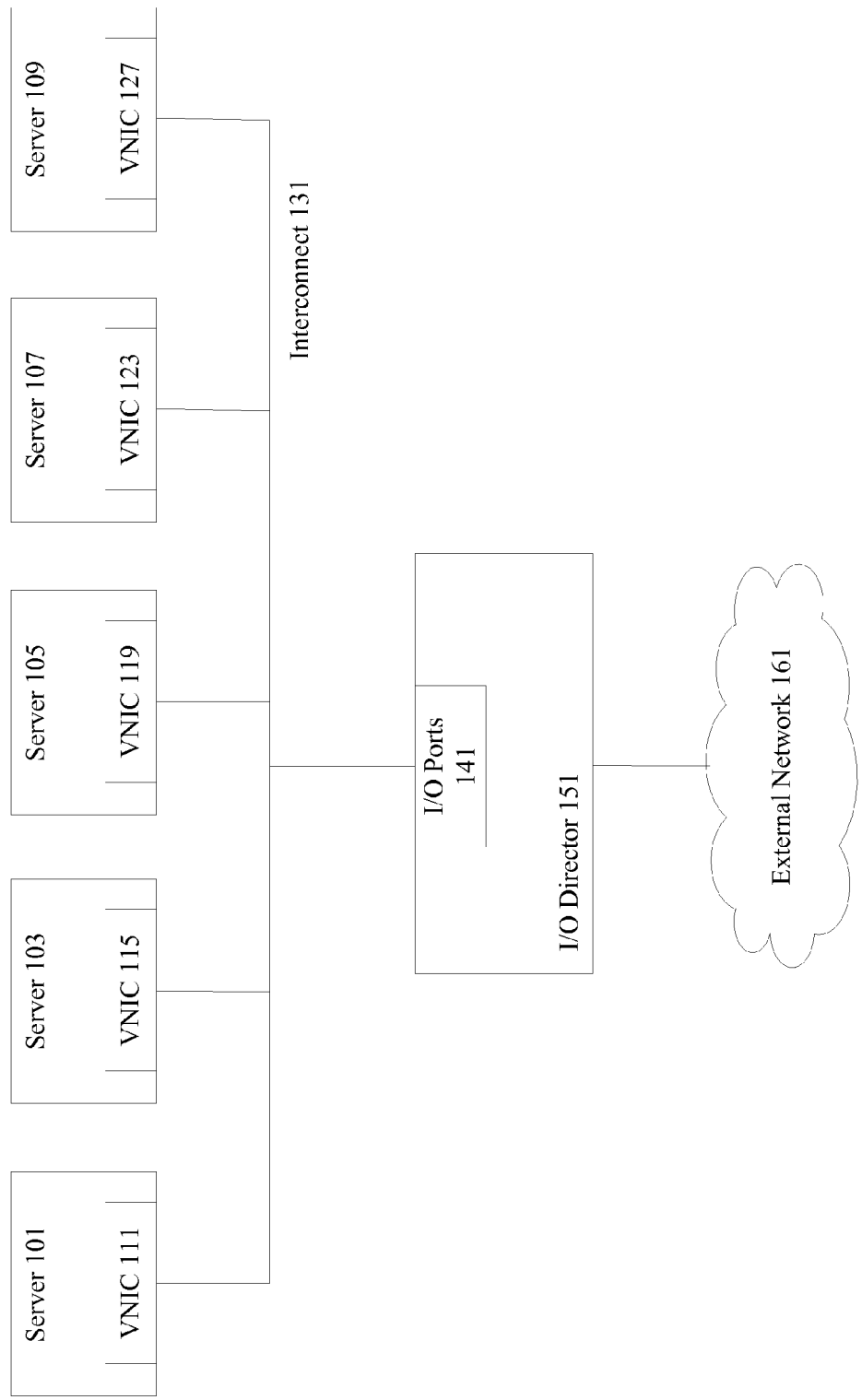
FIG. 1 illustrates one example of a system with servers connected to an I/O director.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques and mechanisms of the present invention will be described in the context of Infini-Band and an input/output (I/O) director. However, it should be noted that the techniques and mechanisms of the present invention apply to InfiniBand variations and other types of networks as well as architectures that do not include an I/O director. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

OVERVIEW

Mechanisms are provided to allow servers connected over an InfiniBand fabric to communicate using multiple private virtual interconnects (PVIs). In particular embodiments, the PVIs appear as virtual Ethernet networks to users on individual servers and virtual machines running on the individual servers. Each PVI is represented on the server by a virtual network interface card (VNIC) and each PVI is mapped to its own InfiniBand multicast group. Data can be transmitted on PVIs as Ethernet packets fully encapsulated including the layer 2 header within InfiniBand messages. Broadcast and multicast frames are propagated using InfiniBand.

Example Embodiments

InfiniBand is a switched fabric that provides high bandwidth, low latency, quality of service, and failover capabilities. InfiniBand provides point-to-point bidirectional serial links to connect servers, disk arrays, appliances, etc. Infini-Band offers unicast, multicast, and broadcast support and is often used in cloud computing clusters and data centers.

In particular embodiments, the servers are connected over an InfiniBand fabric to an I/O director. The I/O director provides shared and virtualized I/O resources to the servers. The common approach for providing I/O connectivity to servers and other hosts is to provide I/O controllers within the servers themselves. I/O controllers include Ethernet network interface cards (NICs), Fibre Channel, iSCSI and SAS host bus adapters (HBAs), etc. The I/O controllers are then connected to external devices using cables. External devices include switches, storage devices, display devices, and others. Cabling quickly becomes hard to manage in data centers with a significant number of servers, networks, and storage devices.

In some implementations, I/O controllers are offloaded onto an external shared system referred to herein as an I/O director. The I/O director includes actual I/O resources connected to external devices such as switches and storage. The hosts are connected to the I/O director over InfiniBand, but the number of cables required to provide redundancy and fault tolerance is much lower than the number of cables required when each host has its own I/O resources. In many cases, deploying an I/O director reduces the number of I/O cables per server from half a dozen or a dozen to one or two cables. A VNIC driver is provided for communication with the VNIC I/O modules at the I/O director and for providing network device services on the server which correspond to those provided by local physical NICs. The end result is that servers have connectivity to any number of different data and storage networks using virtual I/O devices.

Although servers can efficiently communicate with external entities on external networks using virtualized I/O resources, communications with other servers on the same InfiniBand fabric are not necessarily efficient. Communications with other servers on the same InfiniBand fabric are still required to pass through the I/O module at the I/O director. Having local communications pass through the I/O module at the I/O director is inefficient and introduces a significant bandwidth, latency, and throughput limitations. Furthermore, if virtual networks are desired, one port at the I/O module is required for each separate virtual network. This can be problematic in systems that require thousands of virtual networks.

Consequently, the techniques of the present invention provide mechanisms for implementing virtual networks in an InfiniBand fabric. According to various embodiments, servers are connected over an InfiniBand fabric using virtual NICs (VNICs) that encapsulate Ethernet packets including layer 2 headers in InfiniBand messages. Servers and virtual machines can communicate as though the servers and virtual machines are connected using an Ethernet architecture. Different VNICs are provided for each virtual network. According to various embodiments, each virtual network is referred to herein as a private virtual interconnect (PVI). Each PVI provides logically isolated communications. A server may be a member of any number of PVIs.

According to various embodiments, an administrator uses a management system to assign PVIs to servers. Each PVI is represented on the server by a VNIC which is used to access the PVI. Each PVI is mapped to its own InfiniBand multicast group which serves as its broadcast domain. PVI unicast frames are encapsulated in their entirety within InfiniBand reliable connected (RC) and unreliable datagram (UD) protocol messages. By contrast, a mechanism such as IP over InfiniBand does not include layer 2 headers in encapsulation.

Broadcast and multicast frames are propagated using InfiniBand multicast operations. In particular embodiments, mechanisms are provided for learning mappings between layer 2 addresses used within the PVI and their corresponding InfiniBand end points. Failover in case of link or switch failure is supported.

According to various embodiments, a very large number of isolated virtual networks can be created and scaled in a manner that allows high performance server-to-server communication. The mechanism is scalable, easy to manage, and provides significant benefits for a variety of applications. In particular embodiments, all intelligence can be maintained within VNIC drivers at individual servers. No centralized controller is required. Discovery can be performed autonomously with existing InfiniBand messages. Users on servers and virtual machines have access to their own networks that appear to them as Ethernet networks.

FIG. 1 illustrates one example of a system that includes multiple servers connected using an InfiniBand fabric to an I/O director. In particular embodiments, multiple servers 101, 103, 105, 107, and 109 are linked through an interconnect 131 such as an InfiniBand fabric. According to various embodiments, the servers 101, 103, 105, 107, and 109 communicate using Ethernet packets encapsulated in InfiniBand messages. VNICs 111, 115, 119, 123, and 127 are provided for servers 101, 103, 105, 107, and 109 respectively. According to various embodiments, VNICs 111, 115, 119, 123, and 127 are virtual network interface cards that appear to users at individual servers to be actual network interface cards.

To communicate with entities on an external network 161, servers 101, 103, 105, 107, and 109 use VNICs 111, 115, 119, 123, and 127 respectively to communicate with an I/O director 151 over the InfiniBand fabric. According to various embodiments, the I/O director 151 includes I/O ports 141. I/O ports 141 include VNICs that provide the servers 101, 103, 105, 107, and 109 with virtualized I/O resources. According to various embodiments, the I/O director includes a target channel adapter (TCA) for actual communications on the InfiniBand fabric. A TCA can be a discrete device, or its functionality can be integrated into another device of the I/O module. A TCA may recognize and terminate various transport protocols (iWARP, RC, etc.)

According to various embodiments, the TCA removes the link and transport protocol headers from the packet when a server transmits a data packet to the I/O ports 141. The TCA then forwards the packet with an internal header to a network processor in the I/O director 151.

According to various embodiments, the network processor may include VNIC to VNIC switching logic. The VNIC-to-VNIC switching logic performs packet forwarding between VNICs terminating on the same Ethernet port. The VNIC-to-VNIC switching logic 227 maintains a table of corresponding VNICs and MAC addresses and performs packet forwarding based on MAC addresses. For example, if VNIC_1 is linked to address MAC_1, and a data packet having MAC_1 as its destination address is received on VNIC_2 which terminates on the same Ethernet port as VNIC 1, then the VNIC-to-VNIC switching logic forwards this packet to VNIC_1. This functionality allows use of an I/O director with external switches that do not forward packets to the same link that they came from, so that the switching is performed, in this case, within I/O modules themselves.

According to various embodiments, the VNIC I/O module also has learning logic, which is used to establish a mapping of VNICs created by virtualization software (on the servers) to VNICs of the I/O director. When a server is virtualized and one or more virtual machines are created on the server, each virtual machine can be associated with one or more VNICs, which are implemented by the server virtualization software. These VNICs are also referred to as virtual machine VNICs or simply VM VNICs. According to various embodiments, each VM VNIC has a MAC address, which is assigned by the virtualization software. One or more VM VNICs may be bridged to a single VNIC of the I/O director using a software virtual switch, which is implemented by the virtualization software. In particular embodiments, the traffic of multiple VM VNICs may appear on the same VNIC of the I/O director, and this traffic may include packets with different source MAC addresses for the different VM VNICs. According to various embodiments, the VNIC I/O module 203 establishes a mapping between a VM VNIC MAC address and a corresponding VNIC of the I/O director. This mapping enables directing incoming traffic to the correct VNIC of the I/O director. For example, if a packet with destination MAC address MAC_1 arrives at the I/O module Ethernet port, and MAC_1 is the address of VM VNIC_1, then the I/O module needs to know which VNIC of the I/O director should receive this packet. In certain embodiments, a lookup is performed in a mapping table to establish this I/O director VNIC to VM VNIC correspondence.

By using VNICs 111, 115, 119, 123, and 127 to communicate with an I/O director 151, communication with external network 161 can be performed efficiently using shared and virtualized I/O resources. However, even communications between servers 101, 103, 105, 107, and 109 that are not destined for any external network 161 have to go through the I/O director 151. Requiring all inter-server communications to go through the I/O director 151 is inefficient and introduces an artificial bottleneck into a system. Furthermore, the number of virtual networks that can be created in an InfiniBand fabric is limited by the number of ports in an I/O module of the I/O director 151. For example, creating 1500 virtual networks in an InfiniBand fabric would require 1500 ports.

Figure 2:
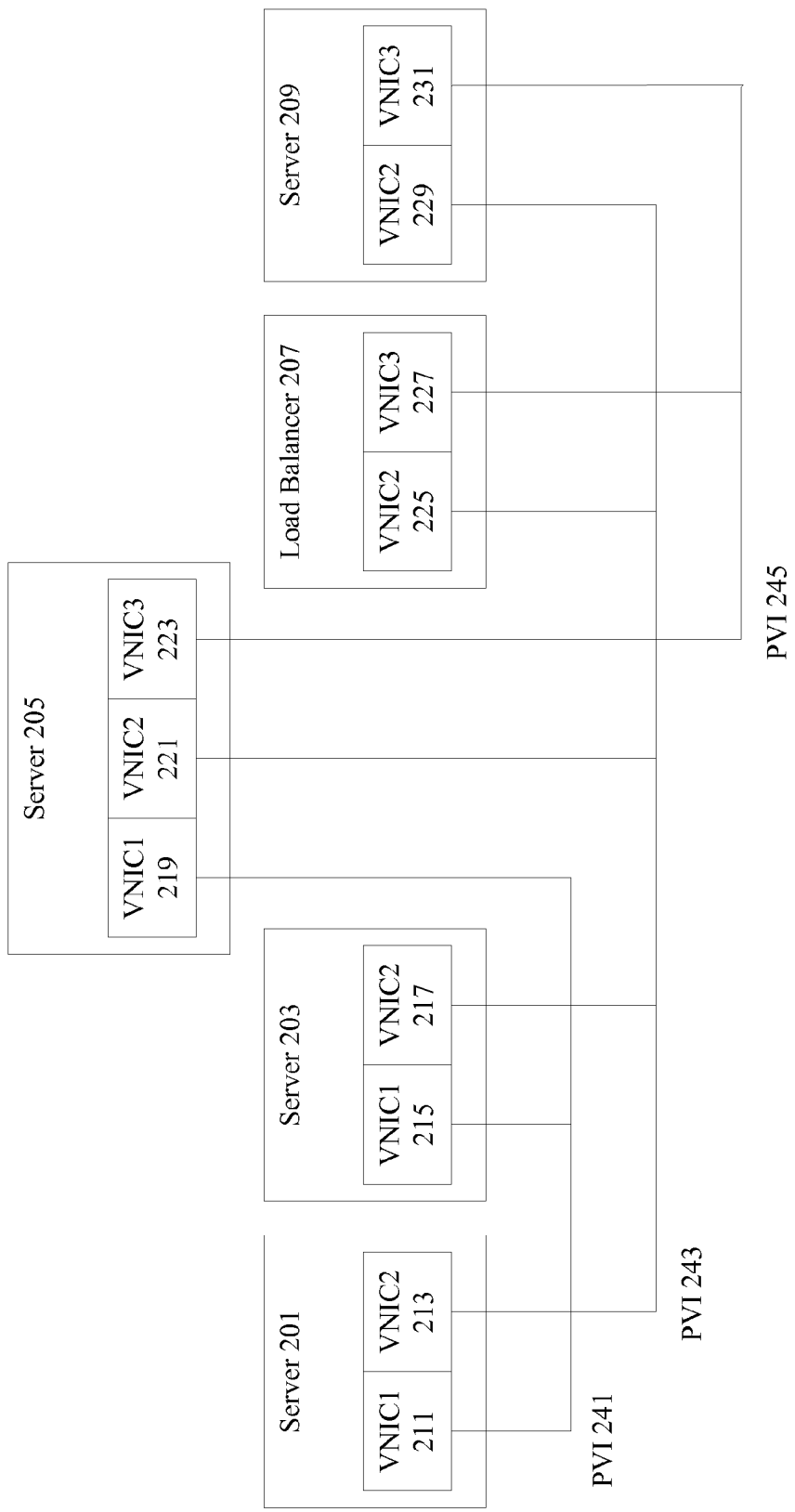
FIG. 2 illustrates one example of a system having multiple servers and multiple private virtual interconnects (PVIs) over InfiniBand.

FIG. 2 illustrates one example of system that includes multiple servers connected over multiple virtual networks. An InfiniBand fabric includes multiple servers 201, 203, 205, 207, and 209. According to various embodiments, server 201 is assigned VNIC1 211 and VNIC2 213. Server 203 is assigned to VNIC1 215 and VNIC2 217. Server 205 is assigned VNIC1 219, VNIC2 221 and VNIC3 223. In particular embodiments, server 207 is a load balancer or other appliance assigned VNIC2 225 and VNIC3 227. Server 209 is assigned VNIC2 229 and VNIC3 231.

According to various embodiments, servers 201, 203, and 205 assigned VNIC1 211, 215, and 219, respectively, are members of private virtual interconnect (PVI) 241. Servers 201, 203, 205, 207, and 209 assigned VNIC2 213, 217, 221, 225, and 229, respectively, are members of PVI 243. Servers 205, 207, and 209 assigned VNIC3 223, 227, and 231, respectively, are members of PVI 245. According to various embodiments, communications on PVI 241, 243, and 245 are transmitted as Ethernet packets including layer 2 headers encapsulated in InfiniBand reliable connected (RC) and unreliable datagram (UD) protocol messages. According to various embodiments, a PVI can be created when an administrator directs a server to create a new VNIC corresponding to a virtual network identifier such as a net_ID. According to various embodiments, the net_ID is translated to a multicast group identifier by performing minor bit modification. Based on multicast group identifier, a multicast group join operation is propagated to the subnet manager.

If the server is the first member of the multicast group corresponding to a virtual network, the subnet manager creates a multicast group and adds the port to the multicast group using the multicast group ID corresponding to the net_ID and programs all switches on the path to add the new port. If the server is not the first member, the subnet manager adds the port to the multicast group and programs all switches on the path to add the new port. A driver then creates the VNIC on the server. It should be noted that InfiniBand elements, such as queue pairs necessary for communication, may also be created at this point, e.g. for UD communications or later on, e.g. for RC communications. A queue pair may include a send queue and a receive queue created in tandem and identified by a queue pair number.

Figure 3:
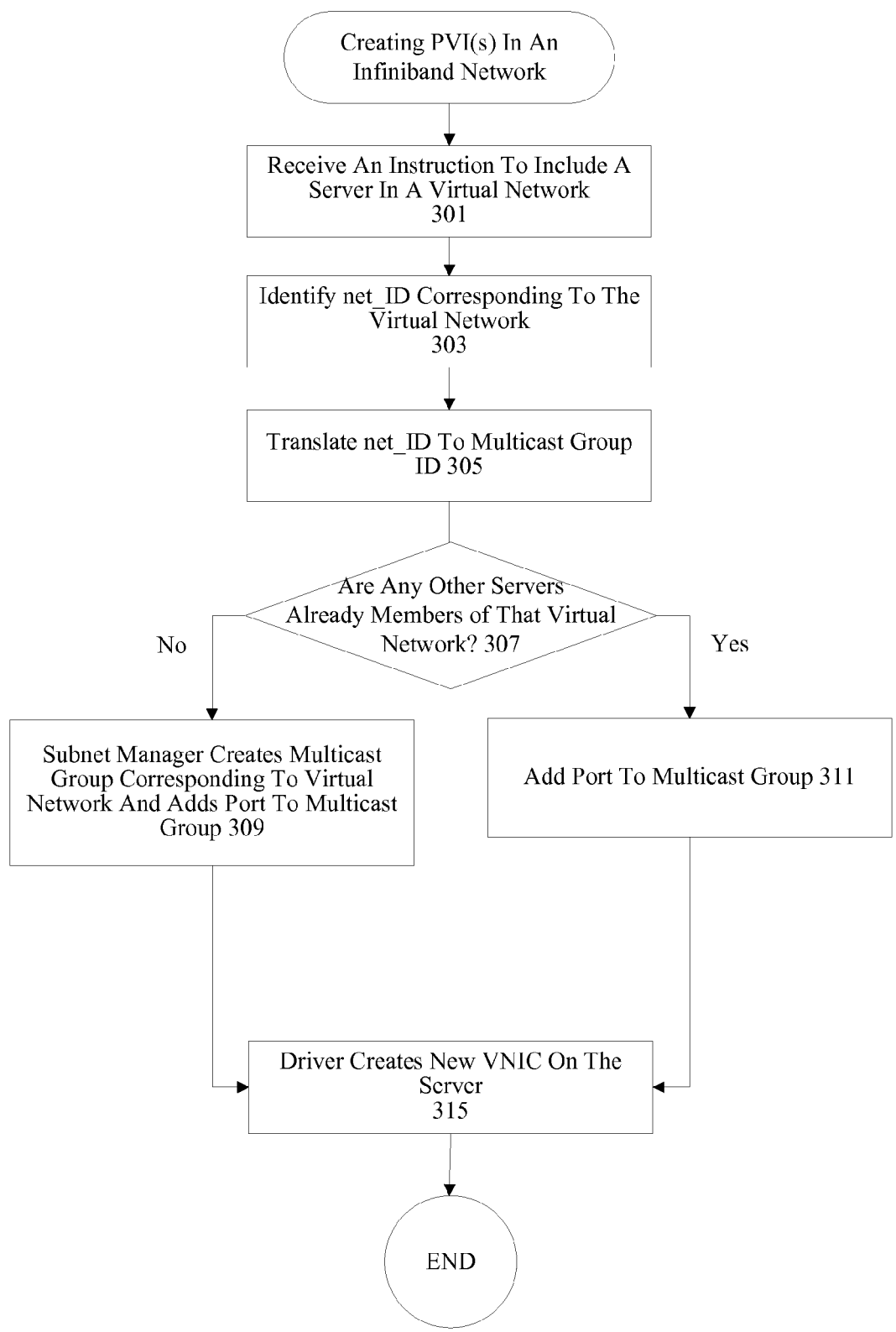
FIG. 3 illustrates one example of a technique for creating a PVI.

FIG. 3 illustrates one example of a mechanism for creating one or more private virtual interconnects (PVIs) in an InfiniBand network connecting multiple servers and/or appliances such as load balancers and security systems. The servers may or may not be connected to an I/O director that provides shared and virtualized I/O resources to the servers. According to various embodiments, an instruction is received at 301 to include a server in a virtual network. At 303, a net_ID corresponding to the virtual network is identified. At 305, the net_ID is translated to a multicast group ID using minor bit modification. Based on multicast group identifier, a multicast group join operation is propagated to the subnet manager. If the server is the first member of the multicast group corresponding to a virtual network, the subnet manager creates at 309 a multicast group and adds the port to the multicast group using the multicast group ID corresponding to the net_ID and programs all switches on the path to add the new port. If the server is not the first member, the subnet manager creates a multicast group and adds the port to the multicast group using the multicast group ID corresponding to the net_ID and programs all switches on the path to add the new port at 309. If the server is not the first member, the subnet manager adds the port to the multicast group and programs all switches on the path to add the new port at 311. According to various embodiments, a driver then creates the new VNIC on the server at 315.

FIG. 4 illustrates one example of a forwarding table used for transmitting data in an InfiniBand network that supports multiple virtual networks. A private virtual interconnect driver forwarding table 401 is provided on a per VNIC driver basis. The forwarding table 401 includes a destination address 411, a VLAN identifier 413, destination InfiniBand address information 415, and destination queue pair information 417. According to various embodiments, the destination InfiniBand address information 415 may be a destination InfiniBand address vector. In particular embodiments, the destination 411 and VLAN ID 413 pair are used to identify unique forwarding table entries. The destination InfiniBand address info 415 and destination queue pair 417 are used to forward data based on InfiniBand standard UD and RC mechanisms.

Figure 5:
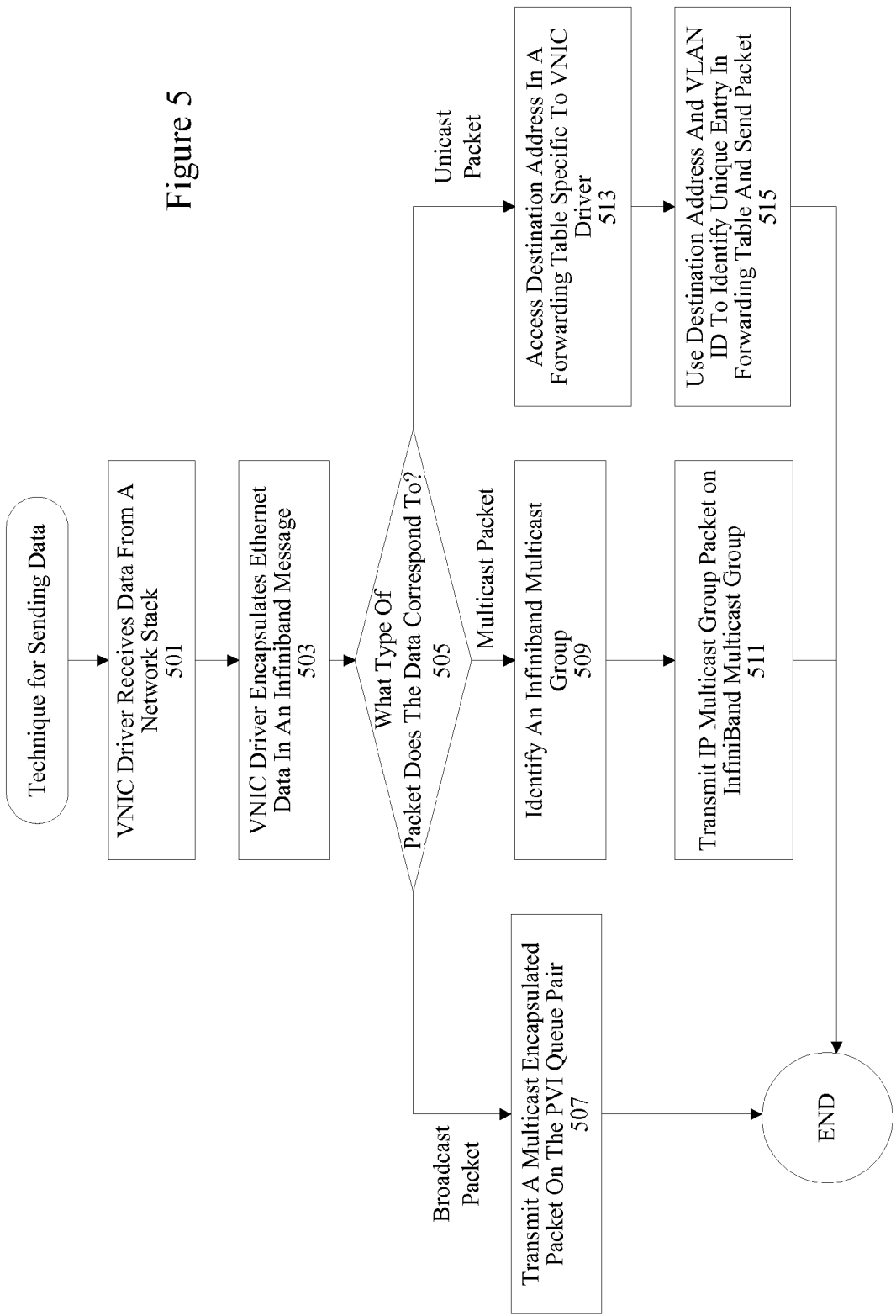
FIG. 5 illustrates one example of a technique for sending data.

FIG. 5 illustrates one example of a technique for sending data. According to various embodiments, a VNIC driver receives data from a network stack at 501. The data may be Ethernet data that the VNIC driver encapsulates in an InfiniBand message at 503. It is determined whether the data corresponds to a broadcast packet, a multicast packet, or a unicast packet at 505. If the data corresponds to a broadcast packet, a multicast encapsulated packet is transmitted on the PVI queue pair at 507. If the data corresponds to a multicast packet, an InfiniBand multicast group is identified at 509. In some instances, the multicast packet can be treated as a broadcast packet and transmitted to everyone on the PVI multicast group. In other instances, an InfiniBand multicast group is created for each IP multicast group is used for multicast operations. The multicast group packet can then be transmitted using the IB multicast group at 511.

If the data corresponds to a unicast packet, the destination address is accessed in a forwarding table specific to that VNIC driver at 513. The destination address and a VLAN ID are used to identify a unique entry in the forwarding table 515. Conventional InfiniBand forwarding mechanisms are then used to transmit UD and RC packets.

When a destination server receives an InfiniBand message, InfiniBand message encapsulation is removed to extract Ethernet data. Information from the InfiniBand message can be used to populate a forwarding table at the destination server. Information may include destination queue pair and destination address.

Figure 6:
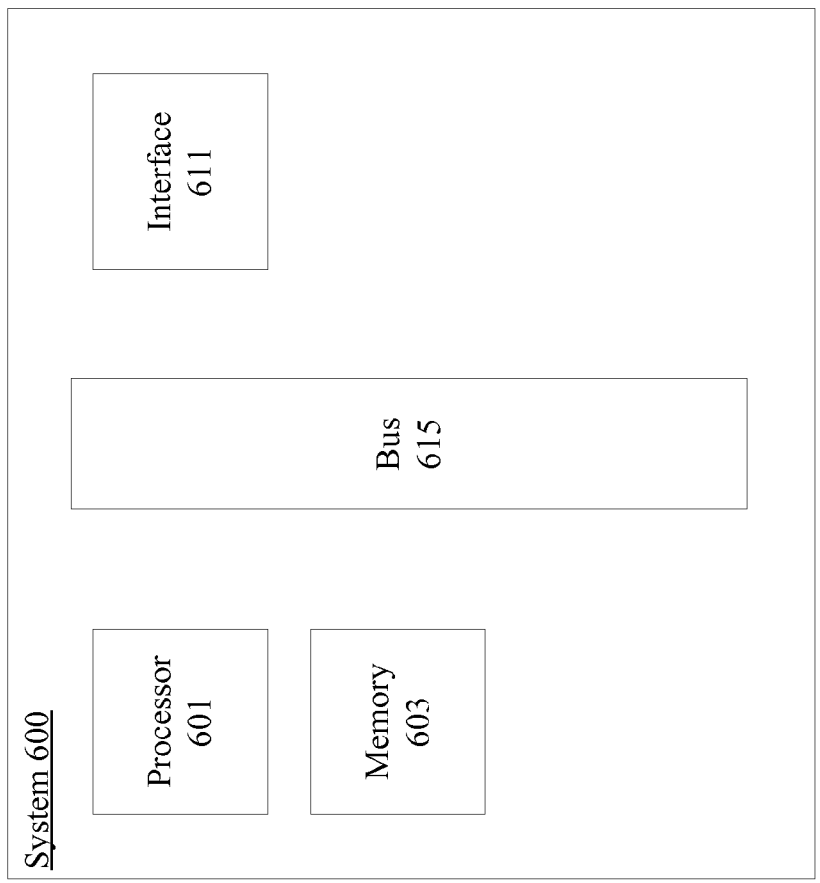
FIG. 6 provides one example of a system that can be used to implement one or more mechanisms.

According to various embodiments, the various mechanisms can be implemented in hardware, firmware, and/or software. FIG. 6 provides one example of a system that can be used to implement one or more mechanisms. For example, the system shown in FIG. 6 may be used to implement a server or an I/O director.

According to particular example embodiments, a system 600 suitable for implementing particular embodiments of the present invention includes a processor 601, a memory 603, an interface 611, and a bus 615 (e.g., a PCI bus). When acting under the control of appropriate software or firmware, the processor 601 is responsible for such tasks such as data modification. Various specially configured devices can also be used in place of a processor 601 or in addition to processor 601. The complete implementation can also be done in custom hardware. The interface 611 is typically configured to send and receive data packets or data segments over a network. Particular examples of interfaces the device supports include host bus adapter (HBA) interfaces, Ethernet interfaces, frame relay interfaces, cable interfaces, DSL interfaces, token ring interfaces, and the like.

In addition, various very high-speed interfaces may be provided such as fast Ethernet interfaces, 1/10/40/100 Gigabit Ethernet interfaces, ATM interfaces, HSSI interfaces, POS interfaces, FDDI interfaces, Host Channel Adapter, and the like. Generally, these interfaces may include ports appropriate for communication with the appropriate media. In some cases, they may also include an independent processor and, in some instances, volatile RAM. The independent processors may control communications-intensive tasks.

According to particular example embodiments, the system 600 uses memory 603 to store data, algorithms, and program instructions. The program instructions may control the operation of an operating system and/or one or more applications, for example. The memory or memories may also be configured to store received data and process received data.

Because such information and program instructions may be employed to implement the systems/methods described herein, the present invention relates to tangible, machine readable media that include program instructions, state information, etc. for performing various operations described herein. Examples of machine-readable media include, but are not limited to, magnetic media such as hard disks, floppy disks, and magnetic tape; optical media such as CD-ROM disks and DVDs; magneto-optical media such as optical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. Therefore, the present embodiments are to be considered as illustrative and not restrictive and the invention is not to be limited to the details given herein, but may be modified within the scope and equivalents of the appended claims.

What is claimed is:

1. A method for creating a virtual network, the method comprising:
   converting a virtual network identifier to an InfiniBand multicast group identifier at a first server;
   sending an InfiniBand multicast message over an InfiniBand fabric, the InfiniBand fabric including the first server, a second server, and a third server, wherein communications between the first server, the second server, and the third server comprise Ethernet packets encapsulated for transmission over the InfiniBand fabric, wherein a network entity receives the InfiniBand multicast message and determines whether the first server is a first member of a multicast group corresponding to a virtual network and adds a port to a multicast group;
   creating a virtual network interface card (VNIC) corresponding to the virtual network identifier for each of the first server, second server, and third server; and
   creating a Private Virtual Interconnect (PVI) between two or more of the first server, second server, or third server using the VNIC, the PVI comprising a virtual Ethernet network corresponding to the virtual network identifier, wherein the two or more of the first, second, and third servers of the virtual Ethernet network communicate via the PVI using Ethernet packets encapsulated within InfiniBand messages.

2. The method of claim 1, wherein the InfiniBand multicast message is associated with an InfiniBand multicast join operation.

3. The method of claim 1, wherein the network entity is a subnet manager.

4. The method of claim 3, wherein if the first server is the first member of the multicast group, the subnet manager creates the multicast group.

5. The method of claim 1, wherein the multicast group corresponds to the virtual network.

6. The method of claim 1, wherein converting the virtual network identifier to the InfiniBand multicast group comprises performing bit modification.

7. The method of claim 1, wherein the VNIC is created by a driver on the first server.

8. The method of claim 1, wherein the second server is a network appliance.

9. A system comprising:
   a processor; and
   a memory coupled with and readable by the processor and storing therein a set of instructions which, when executed by the processor, causes the processor to create a virtual network by:
      converting a virtual network identifier to an InfiniBand multicast group identifier at a first server;
      sending an InfiniBand multicast message over an InfiniBand fabric, the InfiniBand fabric including the first server, a second server, and a third server, wherein communications between the first server, the second server, and the third server comprise Ethernet packets encapsulated for transmission over the InfiniBand fabric, wherein a network entity receives the InfiniBand multicast message and determines whether the first server is a first member of a multicast group corresponding to a virtual network and adds a port to a multicast group;
      creating a virtual network interface card (VNIC) corresponding to the virtual network identifier for each of the first server, second server, and third server; and
      creating a Private Virtual Interconnect (PVI) between two or more of the first server, second server, or third server using the VNIC, the PVI comprising a virtual Ethernet network corresponding to the virtual network identifier, wherein the two or more of the first, second, and third servers of the virtual Ethernet network communicate via the PVI using Ethernet packets encapsulated within InfiniBand messages.

10. The system of claim 9, wherein the InfiniBand multicast message is associated with an InfiniBand multicast join operation.

11. The system of claim 9, wherein the network entity is a subnet manager.

12. The system of claim 11, wherein if the first server is the first member of the multicast group, the subnet manager creates the multicast group.

13. The system of claim 9, wherein the multicast group corresponds to a virtual network.

14. The system of claim 9, wherein converting the virtual network identifier to the InfiniBand multicast group comprises performing bit modification.

15. The system of claim 9, wherein the VNIC is created by a driver on the first server.

16. The system of claim 9, wherein the second server is a network appliance.

17. A non-transitory computer readable medium comprising a set of instructions stored therein which, when executed by a processor, causes the processor to create a virtual network by:

converting a virtual network identifier to an InfiniBand multicast group identifier at a first server;

sending an InfiniBand multicast message over an InfiniBand fabric, the InfiniBand fabric including the first server, a second server, and a third server, wherein communications between the first server, the second server, and the third server comprise Ethernet packets encapsulated for transmission over the InfiniBand fabric, wherein a network entity receives the InfiniBand multicast message and determines whether the first server is a first member of a multicast group corresponding to a virtual network and adds a port to a multicast group;

creating a virtual network interface card (VNIC) corresponding to the virtual network identifier for each of the first server, second server, and third server; and creating a Private Virtual Interconnect (PVI) between two or more of the first server, second server, or third server using the VNIC, the PVI comprising a virtual Ethernet network corresponding to the virtual network identifier, wherein the two or more of the first, second, and third servers of the virtual Ethernet network communicate via the PVI using Ethernet packets encapsulated within InfiniBand messages.

18. The non-transitory computer readable medium of claim 17, wherein the InfiniBand multicast message is associated with an InfiniBand multicast join operation.

\* \* \* \* \*

UNITED STATES PATENT AND TRADEMARK OFFICE
CERTIFICATE OF CORRECTION

| | | |
|---|---|---|
| PATENT NO. | : 9,083,550 B2 | Page 1 of 1 |
| APPLICATION NO. | : 13/663405 | |
| DATED | : July 14, 2015 | |
| INVENTOR(S) | : Cohen et al. | |

It is certified that error appears in the above-identified patent and that said Letters Patent is hereby corrected as shown below:

In the specification

In column 4, line 19, delete "etc.)" and insert -- etc.). --, therefor.

In column 6, lines 7-14, delete "the subnet……….at 315." and insert the same on col. 6, line 6, after "manager," as a continuation of paragraph.

Signed and Sealed this
Eighth Day of March, 2016

Michelle K. Lee
*Director of the United States Patent and Trademark Office*